United States Patent
Jactat

(10) Patent No.: US 9,319,344 B2
(45) Date of Patent: *Apr. 19, 2016

(54) MOBILE RADIO COMMUNICATIONS DEVICE FOR COMMUNICATION WITHIN A PACKET DATA NETWORK

(71) Applicant: Caroline Jactat, Reading (GB)

(72) Inventor: Caroline Jactat, Reading (GB)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 73 days.

This patent is subject to a terminal disclaimer.

(21) Appl. No.: 14/085,520

(22) Filed: Nov. 20, 2013

(65) Prior Publication Data

US 2014/0078995 A1   Mar. 20, 2014

Related U.S. Application Data

(63) Continuation of application No. 13/263,009, filed as application No. PCT/JP2010/055984 on Mar. 25, 2010, now Pat. No. 8,619,694.

(30) Foreign Application Priority Data

Apr. 7, 2009   (GB) .................................. 0906014.6

(51) Int. Cl.
*H04L 12/911*   (2013.01)
*H04W 76/02*   (2009.01)

(52) U.S. Cl.
CPC ............. *H04L 47/70* (2013.01); *H04W 76/027* (2013.01)

(58) Field of Classification Search
CPC .................. H04L 47/70; H04W 76/02–76/028
See application file for complete search history.

(56) References Cited

U.S. PATENT DOCUMENTS

| | | |
|---|---|---|
| 2004/0132452 A1 | 7/2004 | Lee |
| 2006/0215595 A1 | 9/2006 | Hancock et al. |
| 2007/0019643 A1 | 1/2007 | Shaheen |
| 2007/0242738 A1 | 10/2007 | Park et al. |
| 2010/0081435 A1 | 4/2010 | Huang |

FOREIGN PATENT DOCUMENTS

| | | |
|---|---|---|
| CN | 1875654 A | 12/2006 |
| CN | 1901734 A | 1/2007 |
| EP | 1655901 A1 | 5/2006 |
| JP | 2006-135986 A | 5/2006 |
| JP | 2009-516399 A | 4/2009 |

OTHER PUBLICATIONS

Office Action dated Oct. 9, 2013, issued by the Japanese Patent Office in corresponding Application No. 2011-543392.

(Continued)

*Primary Examiner* — Pao Sinkantarakorn

(57) ABSTRACT

The invention provides for a mobile radio communications device for communication within a packet data network and arranged for transmitting dedicated bearer set-up signalling to the network as part of a network attachment procedure, the device further being arranged to store the said dedicated bearer set-up signalling and to transmit or retransmit the same responsive to the success of attach complete signalling.

2 Claims, 1 Drawing Sheet

(56) References Cited

OTHER PUBLICATIONS

"3GPP TS 24.301, V8.1.0, 3rd Generation Partnership Project, Technical Specification Group Core Network and Terminals; Non-Access-Stratum (NAS) protocol for Evolved Packet System (EPS)", <URL: http://www.3gpp.org/ftp/Specs/2009-03/Rel-8/24_series/24301-810.zip>, Mar. 2009, pp. 1-6.

"3GPP TS 23.401, V9.0.0, 3rd Generation Partnership Project, Technical Specification Group Services and System Aspects; General Packet Radio Service (GPRS) enhancements for Evolved Universal Terrestrial Radio Access Network (E-UTRAN)", <URL: http://www.3gpp.org/ftp/Specs/2009-03/Rel-9/23_series/23401-900.zip>, Mar. 2009, pp. 1-4.

Office Action dated Dec. 11, 2013, issued by the State Intellectual Property Office of the P.R.C. in corresponding Chinese Application No. 201080015793.4.

Communication dated Aug. 6, 2014 from the Japanese Patent Office in counterpart application No. 2013-254417.

3GPP TS 24.301 V1.0.0, "Pseudo-CR on the network does not receive the Attach Complete message in attach procedure," VIA Technologies Inc, Oct. 6-10, 2008, pp. 1-4, Phoenix, Arizona.

Communication dated Aug. 15, 2014 from the State Intellectual Property Office of the People's Republic of China in counterpart application No. 201080015793.4.

MOBILE RADIO COMMUNICATIONS DEVICE FOR COMMUNICATION WITHIN A PACKET DATA NETWORK

CROSS REFERENCE TO RELATED APPLICATIONS

This application is a continuation of Ser. No. 13/263,009 filed Oct. 5, 2011, which is a National Stage of International Application No. PCT/JP2010/0555984 filed Mar. 25, 2010, claims priority based on United Kingdom Patent Application No. 090614.6 filed Apr. 7, 2009, the contents of which are incorporated herein by reference in their entirety.

TECHNICAL FIELD

The present invention relates to a packet data network communications device and to a related method of operation thereof.

In particular, the present invention relates to a packet data network communications device, and related method, concerning signalling developed during a network attach procedure.

BACKGROUND ART

Ongoing standardisation of evolved 3GPP networks and system architecture has most recently focussed upon the so called Evolved Packet System (EPS) involving Long Term Evolution (LTE) system architectures.

Such packet data networks are generally arranged to employ a plurality of EPS bearers each of which comprises a radio bearer and a mobility tunnel and which is associated with one of a plurality Quality of Service (QoS) profiles which relate to different respective IP flows, for example, VoIP.

Within such an architecture, the User Equipment (UE) tends to initiate connectivity by requesting an attached procedure of the EPS network and the network then enables registration of the UE through the attached procedure by replying with a so-called Attach Accept response along with the relevant default connectivity for the network.

Such default connectivity is generally provided in an attempt to prevent delays in, and increase simplicity of, the network attachment procedure. Optionally however, dedicated bearer resources can also be set up and which are generally associated with the EPS default bearer context.

The UE then completes the attach procedure by responding with an Attached Complete message and can also complete a dedicated bearer resource set-up procedure by responding with a dedicated EPS Bearer Context Activation Response.

DISCLOSURE OF THE INVENTION

Problem to be Solved by the Invention

However, and for various reasons, situations regularly arise wherein lower layers within the UE fail to send an Attach Complete message, for example, if the UE encounters an intra-LTE handover from any time subsequent to receipt of the attached accept message. The Attach Completed message will not then be sent by the lower layers within the UE and this has been identified as potentially problematic.

Arrangements have been proposed for overcoming, or at least mitigating, such problems and one example of the currently known proposals is to initiate performance of a second attached procedure which also generally implies an optional security activation and ESM information request procedure.

The possible re-creation of the default bearer, depending on the network implementation, in both the Non Access Stratum (NAS) and in the Access Stratum (AS) layers within the UE then arises even though the Core Network entity has not changed.

An alternative known option is to re-transmit the Attach Complete signalling in an attempt to avoid a complete re-attach procedure. However, in such a known arrangement, the dedicated bearer resources set-up is only re-initiated by the network after expiry of a related guard-timer gap, generally in the order of eight seconds, which of course can prove limiting insofar as it introduces latency within the whole network system.

With regard to such latency, the UE is likely to continue to request set-up of such dedicated bearers which also disadvantageously leads to increased, but effectively redundant, signalling within the system.

Means to Solve the Problem

The present invention seeks to provide for a packet data network communications device, and method of operation, having advantages over known such devices and methods.

According to a first aspect of the present invention there is provided a mobile radio communications device for communication within a packet data network and arranged for transmitting dedicated bearer set-up signalling to the network as part of a network-attach procedure, the device further being arranged to store the said dedicated bearer set-up signalling and to retransmit the same responsive to the success of attach complete signalling on the network.

The invention can prove particularly advantageous insofar as, with the dedicated bearer set-up signalling being transmitted by the device based on successful transmission of the attach complete message, it proves possible to avoid unnecessary retransmission of an attached request and any associated NAS security activation and ESM information request/response.

As a further advantage, it proves readily possible to maintain consistency of operation with the current handling of upper layer device message retransmissions.

Preferably, the device is arranged so as to retransmit the dedicated bearer set-up signalling responsive to transmission failure of an attach complete message.

Advantageously, such transmission failure is indicated by the radio layers within the mobile radio communications device.

As an alternative feature, the device can be arranged so as to retransmit the dedicated bearer set-up signalling responsive to an indication of a successful transmission of an attach complete message.

As will also be appreciated, the dedicated bearer set-up signalling advantageously comprises a NAS message such that the NAS within the mobile radio communications device can serve to retain the dedicated bearer set-up signalling for subsequent transmission.

According to another aspect of the present invention there is provided a method of network attachment for a mobile radio communications device in a packet data network and including steps of storing a transmitted dedicated bearer set-up signal and retransmitting the same responsive to the success of attach complete signalling within the network.

As with the further possible details of the mobile radio communications device noted above, the method can likewise be arranged for retransmission of the dedicated bearer set-up signalling responsive to identification of transmission failure of an attach Complete message, which indication can be provided by radio bearers within the mobile radio communications device.

The method can also include the step of retransmitting the dedicated bearer's set-up signalling responsive to an indication of successful transmission of an attach Complete message and of course the step of storing the transmitted dedicated bearer set-up signal can be provided by way of the NAS of the device.

Effect of the Invention

As will therefore be appreciated, through adoption of the present invention, and upon failure of an EPS attached response transmission by the lower layers within the UE, which may for example may be due to intra-LTE handover, the UE advantageously does not need to initiate a registration update procedure, i.e. a second attached procedure, or retransmit attached complete procedure. Rather it is proposed to retransmit any related NAS dedicated bearer response signals after the EPS attach response retransmission.

The present invention can then advantageously provide for a relatively high degree of resilience for fast bearer set-up as part of an EPS attach procedure and subsequent NAS message-transmission failure.

BRIEF DESCRIPTION OF THE DRAWING

The invention is described further hereinafter, by way of example only, with reference to the accompanying drawings in which.

BEST MODE FOR CARRYING OUT THE INVENTION

Figure 1:
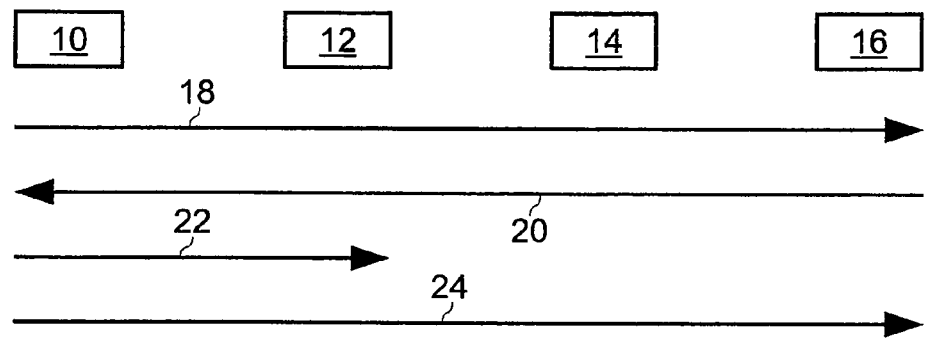
FIG. 1 comprises a signalling diagram schematically representing elements within a packet data network in which the signalling does not experience any transmission failures/errors.

Turning first to FIG. 1, there are illustrated a UENAS 10 and UEAS 12 of an end user's device within a packet data network, and along with an e-Node B 14 and also the Mobile Management Entity (MME) 16 of the network.

As standard, the UE 10, 12 in seeking connection to the packet data network sends an Attach Request signal 18 to the MME and, enabling registration of the UE 10, 12 to the network, the MME 16 returns an Attach Accept signal 20 also including NAS EPS default bearer context set-up request details and, optionally, NAS EPS dedicated bearer context set-up requests.

The UE 10, 12 then acts to complete the attached procedure by sending an Attach Complete signal 22 which of course arises within the lower layers 10 of the UE and which includes a NAS EPS default bearer context set-up response.

While the default bearer context set-up response is useful for limiting delays and generally simplifying the completion of the attached procedure, a NAS EPS dedicated bearer context set-up request 24 subsequently follows from the UE NAS 10 (vis., the UE 10, 12 which is the UE as a whole) such that, during normal operation, the MME 16 can readily process any message related to the EPS dedicated bearer context associated within the EPS default bearer context.

As will be appreciated, the signalling of FIG. 1 is representative of a scenario in which no particular signalling delays/failures arise.

However, it is recognised, particularly within the context of the present invention, that failures can arise which prevent the attach complete message from being sent by the lower layers of the UE such as, for example, through the UE encountering intra-LTE handover, for example from a time subsequent to receipt of the Attach Accept message.

Figure 2:
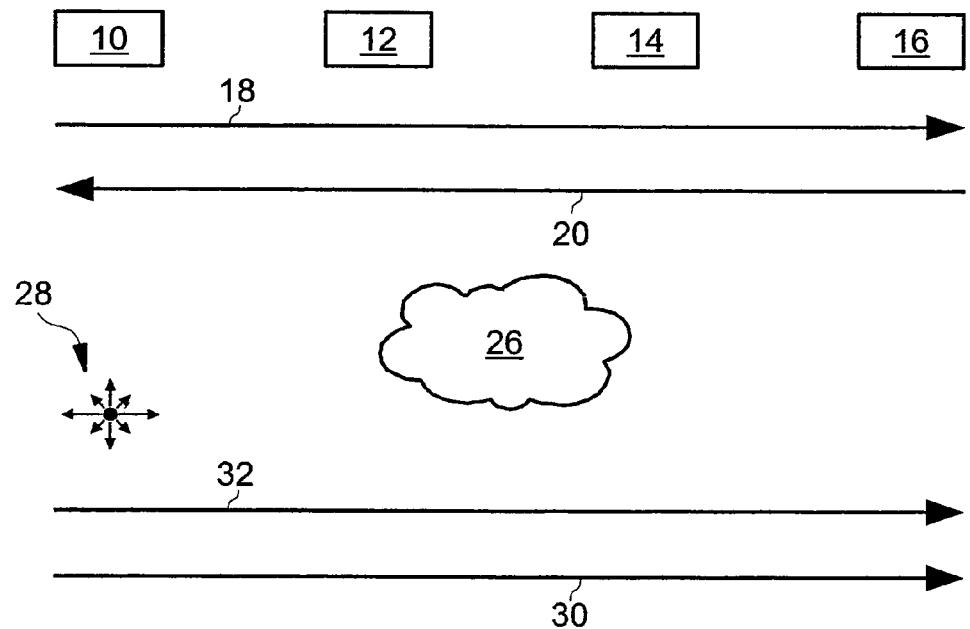
FIG. 2 comprises a similar signalling diagram for the same network elements but illustrating a scenario in which an example of the present invention is enabled so as to overcome problems arising from signalling message failure.

Such interruption of the signalling is illustrated and discussed further with reference to FIG. 2 of the present application.

Turning therefore now to FIG. 2 there are illustrated the same network elements 10, 12, 14 and 16 as illustrated in FIG. 1 and, again, an attach procedure for the UE 10, 12 is initiated by way of Attach Request signalling 18 from the UE 10, 12 to the MME 16, which replies with Attach Accept signalling 20 as discussed above. However, within the scenario FIG. 2, the lower layers within the UE attempt to undertake an intra-LTE handover which can comprise an intra-cell intra E-Node B or indeed an inter E-Node B handover procedure.

In view of the resulting interruption 26, the Attach Complete signalling 22 of FIG. 1 is not successfully transmitted and an indication 28 of such failure arises within the lower levels 10 of the UE 10, 12. It should be appreciated that through the failure arising from the intra-LTE handover 26 the MME 16 will not have received the NASEPS default bearer context set-up response found within the Attach Complete message and so will not be able to process any messages related to the EPS dedicated bearer context associated with the EPS default bearer context.

The advantageous signalling 30 of the present invention is then generated within the lower levels of the UE 10 and which comprises a retransmission of the previously attempted, and at the same time stored, NASEPS dedicated bearer context set-up request. As will be appreciated, this message has previously been stored within the UE NAS 10 ready for such retransmission as required.

Through receipt of such retransmitted message 30, the MME 16 can now process any messages related to the EPS dedicated bearer context associated with the EPS default bearer context previously set-up in the MME by virtue of a preceding Attach Complete message 32 including the NASEPS default bearer context set-up response.

Thus, the present invention can prove advantageous insofar as, as compared with the current art, there is no need to employ a re-start of the attached procedure which has previously been proposed potentially for reasons of simplicity. Further, there is no need to employ a second attach procedure which can be considered sub-optimal insofar as it generally requires an ESM information request procedure and a re-creation of the default bearer, while the MME has in fact not changed.

That is, the invention avoids unnecessary retransmission of an Attach Request, Security Mode Command/Complete and ESM information request/response (if the ESM information (security protected) transfer flag is set), Attach Accept and Activate Dedicated EPS Bearer Context Request(s). Of course, the only case where the retransmission of downlink messages is meaningful is for Core Network entity change, but this is a rare case. To maintain consistency with current behaviour pertaining to other NAS messages retransmission (as per the last message allowing to complete a procedure, it is currently retransmitted i.e. TAU Complete, GUTI reallocation complete, Authentication Response/Failure, Security Mode Complete/Reject and Detach Accept) on intra LTE handover if TAI has not changed or new TAI is still in the TAI list.

As will be appreciated, the present invention provides particular use within the field of multiple bearer set-up of EPS attach and in scenarios where intra-LTE handover for the System Architecture Evolution (SAE) is likely to arise.

In particular, it will be appreciated that the NAS in the UE memorizes that is has sent dedicated bearers set-up responses to the network. If radio layers indicate that the EPS attach complete message has failed to be transmitted, then the stored dedicated bearers set-up responses are retransmitted when there is no need to perform a registration procedure. Alternatively, the UE can wait for the indication of successful transmission of the Attach Complete message prior to transmitting dedicated bearers set-up responses if any.

This application claims the benefit of priority from United Kingdom patent application No. 0906014.6, filed on Apr. 7, 2009, the disclosure of which is incorporated herein in its entirety by reference.

The invention claimed is:

1. A mobile radio communications device comprising:
a transmitter configured to transmit an attach request message to a network;
a receiver configured to receive an attach accept message;
wherein said transmitter is configured to transmit an attach complete message which includes a signal related to EPS dedicated bearer context and
wherein said transmitter is configured to retransmit the signal related to the EPS dedicated bearer context based on reception of the attach complete message and without retransmitting an attach request message to the network.

2. A mobile radio communication method comprising:
transmitting an attach request message to a network;
receiving an attach accept message;
transmitting an attach complete message which includes a signal related to EPS dedicated bearer context; and
retransmitting the signal related to the EPS dedicated bearer context based on reception of the attach complete message and without retransmitting an attached request message to the network.

* * * * *